US 8,421,884 B2

(12) United States Patent
Wang et al.

(10) Patent No.: US 8,421,884 B2
(45) Date of Patent: Apr. 16, 2013

(54) GPS DEVICE WITH A DISPLAY FUNCTION AND METHOD FOR USING THE SAME

(75) Inventors: Bily Wang, Hsinchu (TW); Yuan-Hsiu Yang, Kaohsiung (TW)

(73) Assignee: Youngtek Electronics Corporation, Hsinchu (TW)

( * ) Notice: Subject to any disclaimer, the term of this patent is extended or adjusted under 35 U.S.C. 154(b) by 891 days.

(21) Appl. No.: 12/554,924

(22) Filed: Sep. 7, 2009

(65) Prior Publication Data

US 2010/0214443 A1   Aug. 26, 2010

(30) Foreign Application Priority Data

Feb. 25, 2009   (TW) .............................. 98105910 A

(51) Int. Cl.
*H04N 5/225*   (2006.01)
*H04N 5/76*   (2006.01)

(52) U.S. Cl.
USPC .................... 348/231.5; 348/207.2

(58) Field of Classification Search ............... 348/207.1, 348/222.1, 231.99, 231.3, 231.5, 231.6
See application file for complete search history.

(56) References Cited

U.S. PATENT DOCUMENTS

| 7,129,973 | B2* | 10/2006 | Raynor ...................... 348/231.3 |
| 7,797,135 | B2* | 9/2010 | Fitzhugh ....................... 702/186 |
| 7,813,596 | B2* | 10/2010 | Di Bernardo et al. ........ 382/305 |
| 7,844,077 | B2* | 11/2010 | Kochi et al. ................... 382/103 |
| 2011/0039573 | A1* | 2/2011 | Hardie ........................ 455/456.1 |
| 2011/0074629 | A1* | 3/2011 | Khan et al. ............... 342/357.64 |
| 2012/0142322 | A1* | 6/2012 | Gomez ........................ 455/414.3 |
| 2012/0191755 | A1* | 7/2012 | Naaman et al. ............... 707/770 |

FOREIGN PATENT DOCUMENTS

| JP | 09026489 A | * | 1/1997 |
| JP | 2001309217 A | * | 11/2001 |
| JP | 2009089126 A | * | 4/2009 |

* cited by examiner

*Primary Examiner* — Timothy J Henn
(74) *Attorney, Agent, or Firm* — Pai Patent & Trademark Law Firm; Chao-Chang David Pai

(57) ABSTRACT

A GPS device with a display function includes a GPS recorder and a display screen. The GPS recorder has a GPS casing that encloses one part of the display screen and only a display area of the display screen is exposed. The display screen is electrically disposed on the GPS recorder, and the display screen displays pattern in order to show time information and the position information that have been captured by the GPS recorder. In addition, the GPS recorder has a memory disposed therein for storing the time information and the position information.

12 Claims, 9 Drawing Sheets

GPS DEVICE WITH A DISPLAY FUNCTION AND METHOD FOR USING THE SAME

BACKGROUND OF THE INVENTION

1. Field of the Invention

The present invention relates to a GPS device with a display function and a method for using the same, in particular, to a GPS device using a pattern to display time and a method for using the GPS device.

2. Description of Related Art

There are many methods for people to commemorate an occasion. One common way is by taking pictures, because any occasion such as travel, a celebration, an event, or any good time that deserves to be commemorated can be recorded via a camera. Moreover, it is convenient for users to transmit image data from the camera to an electronic device such as a computer for modifying the image data. In addition, the price of a digital camera has become increasingly cheaper, so the number of people using digital cameras increases day by day. Meanwhile, digital cameras are increasing light, thin, and small.

In the prior art, when a user wanted to mark the metadata of a location on a digital photo, the user had to input the captured digital photo and corresponding metadata based upon their own recollections, to a computer. Next, the computer would further process the digital photos and the corresponding metadata of the digital photo via application software (for example, Photoshop, PhotoImpact, Illustrator, etc.) for further embedding the metadata into the corresponding digital photo.

Such a method, involving writing the location metadata into the header field of the storage file format of the digital photo, is inconvenient and difficult for users.

SUMMARY OF THE INVENTION

In view of the aforementioned issues, the present invention provides a GPS device with a display function and a method for using the same. The present invention can provides a correct shoot time and a correct shoot place for each photo, and the correct shoot time and the correct shoot place can be selectably shown on the corresponding photo.

To achieve the above-mentioned objectives, the present invention provides a GPS device with a display function, including: a GPS recorder and a display screen. The display screen is electrically disposed on the GPS recorder, and the display screen displays pattern in order to show time information that has been captured by the GPS recorder.

To achieve the above-mentioned objectives, the present invention provides a method for using a GPS device with a display function, including: providing a GPS recorder and a display screen, and the display screen electrically disposed on the GPS recorder; turning on the GPS recorder and the display screen and using the GPS recorder to capture a plurality of time and position information sets, and the display screen displaying pattern in order to show time information that has been captured by the GPS recorder; using a digital camera to capture the pattern in order to obtain a pattern image datum, and the pattern image datum obtaining pattern time information that is provided by the digital camera; and using the digital camera to shoot in order to obtain a plurality of photo image data, and each photo image datum obtaining photo time information that is provided by the digital camera.

The method further includes: transmitting the time and position information sets, the pattern image datum and the photo image data to a computer; decoding the pattern image datum by an inner program of the computer to obtain correct pattern time information; comparing the correct pattern time information of the pattern image datum with the pattern time information of the photo image datum to obtain a time error value; using the time error value to adjust the photo time information of each photo image datum in order to obtain correct photo time information for each photo image datum; and comparing the correct photo time information of each photo image datum with the time and position information sets in order to obtain correct position information for each photo image datum.

To achieve the above-mentioned objectives, the present invention provides a method for using a GPS device with a display function, including: providing a GPS recorder and a display screen, and the display screen electrically disposed on the GPS recorder; turning on the GPS recorder and the display screen and using the GPS recorder to capture a plurality of time and position information sets, and the display screen displaying pattern in order to show time information that has been captured by the GPS recorder; using a digital camera to capture the pattern in order to obtain a pattern image datum, and the pattern image datum obtaining pattern time information that is provided by the digital camera; and using the digital camera to shoot in order to obtain a plurality of photo image data, and each photo image datum obtaining photo time information that is provided by the digital camera.

The method further includes: decoding the pattern image datum by an inner program of the digital camera to obtain correct pattern time information; comparing the correct pattern time information of the pattern image datum with the pattern time information of the photo image datum to obtain a time error value; using the time error value to adjust the photo time information of each photo image datum in order to obtain correct photo time information for each photo image datum; and comparing the correct photo time information of each photo image datum with the time and position information sets in order to obtain correct position information for each photo image datum.

Therefore, the GPS device can use a pattern to display the correct time and the correct time can be applied to adjust the shoot time of the photo captured by the digital camera. Hence, the present invention can provides a correct shoot time and a correct shoot place for each photo, and the correct shoot time and the correct shoot place can be selectably shown on the corresponding photo.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
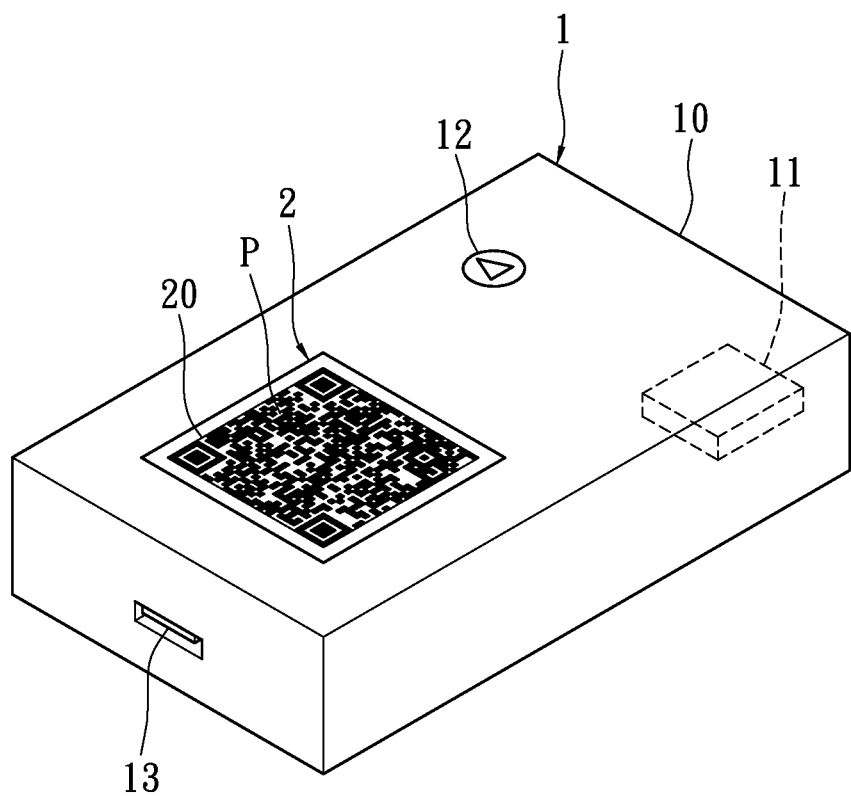
FIG. 1 is a perspective, schematic view of the GPS device with a display function according to the present invention.

Referring to FIG. 1, the present invention provides a GPS (Global Positioning System) device with a display function, including: a GPS recorder 1 and a display screen 2.

The GPS recorder 1 has a GPS casing 10, and the GPS recorder 1 has a memory 11 disposed therein for storing time information and position information that both have been captured by the GPS recorder 1. In addition, the GPS recorder 1 has a power switch 12 in order to turn on or turn off the GPS recorder 1 and the display screen 2. Moreover, the GPS recorder 1 has an output interface 13 such as USB or mini USB, in order to output the time information and the position information to other electronic device such as a computer.

The display screen 2 can be a liquid crystal display or other type of display for displaying information. The display screen 2 is electrically disposed on the GPS recorder 1. One part of the display screen 2 is enclosed by the GPS casing 10 and only a display area 20 of the display screen 2 is exposed. In addition, the display screen 2 displays pattern P in order to show the time information and the position information that both have been captured by the GPS recorder 1. Moreover, the pattern P shown by the display screen 2 can be a barcode such as one-dimension barcode or two-dimension barcode; alternatively, the pattern P can be composed of letters or numbers. Furthermore, the position information includes a latitude and a longitude. In this embodiment of the present invention, the pattern P shown by the display screen 2 is a two-dimension barcode.

Figure 2A:
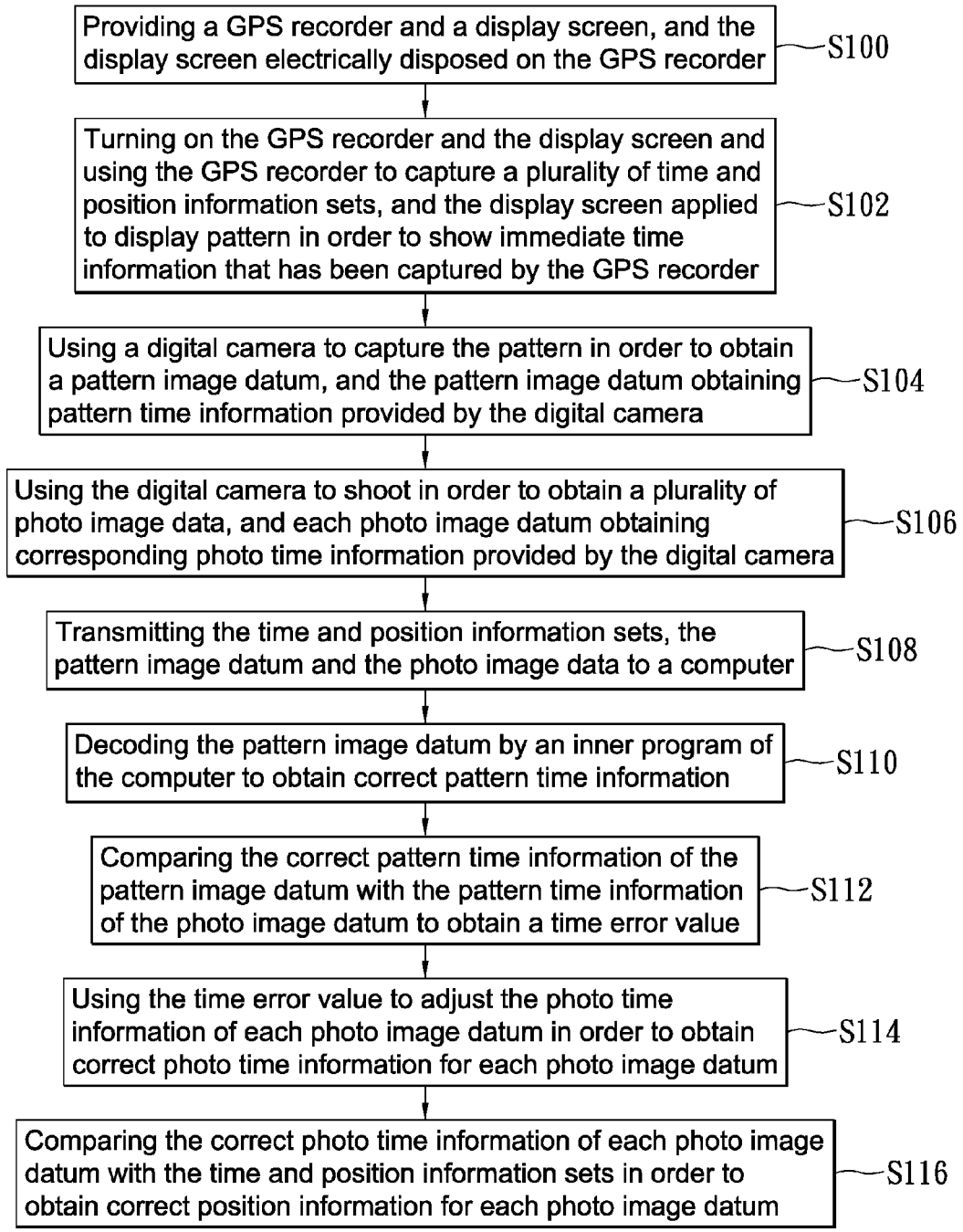
FIG. 2A is a flowchart of the method for using the GPS device with a display function according to the first embodiment of the present invention.
Figure 2B:
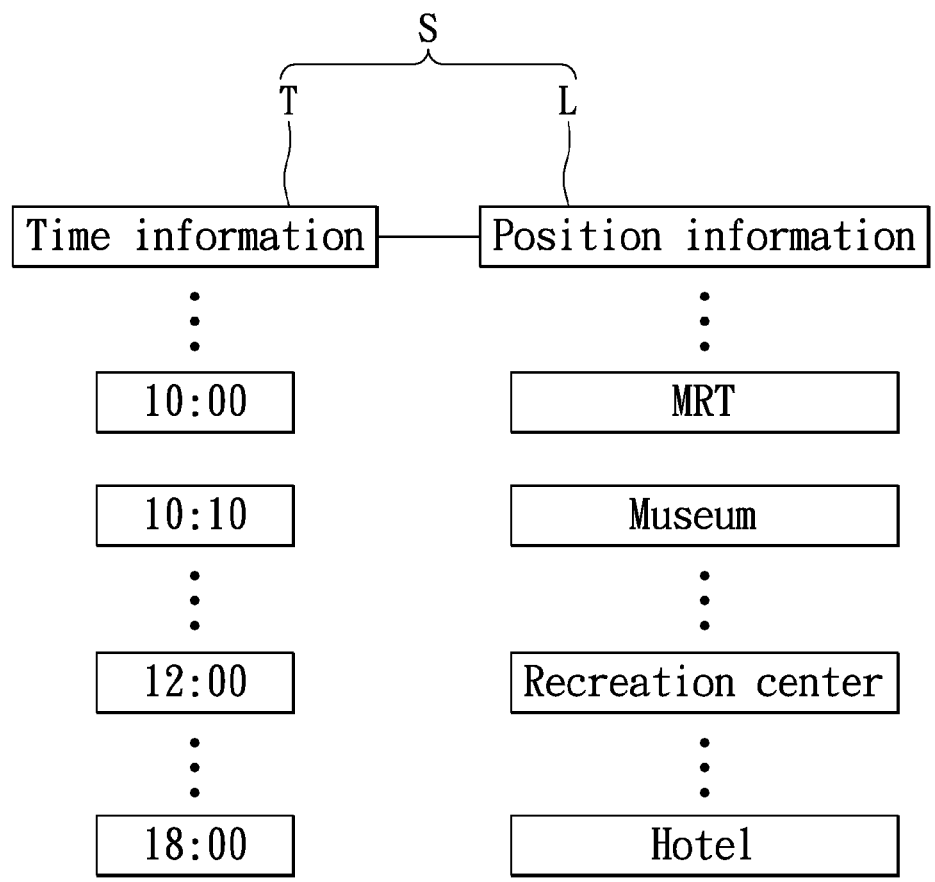
FIG. 2B is a schematic view of the time and position information sets of the GPS device according to the present invention.
Figure 2C:
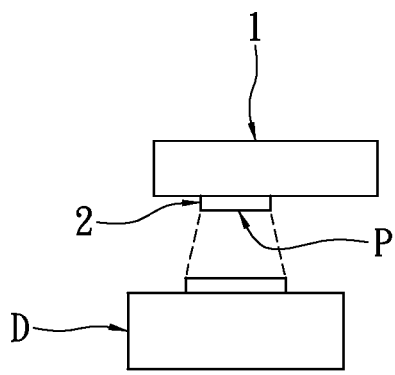
FIG. 2C is a schematic view of using the digital camera to capture the pattern on the display screen according to the present invention.

Referring to FIGS. 2A and 2C, the first embodiment of the present invention provides a method for using a GPS device with a display function. The method includes the following steps:

The step S100 is that: referring to FIGS. 1 and 2A, providing a GPS recorder 1 and a display screen 2, and the display screen 2 being electrically disposed on the GPS recorder 1.

The step S102 is that: referring to FIGS. 1, 2A and 2B, turning on the GPS recorder 1 and the display screen 2 and using the GPS recorder 1 to capture a plurality of time and position information sets S (each time and position information set S is composed of time information T and position information L that both are captured at the same time and the same place), and the display screen 2 being applied to display pattern P in order to show immediate time information that has been captured by the GPS recorder 1. In addition, the pattern P shown by the display screen 2 can be a barcode such as one-dimension barcode or two-dimension barcode; alternatively, the pattern P can be composed of letters or numbers. Furthermore, the position information L includes a latitude and a longitude. Moreover, the latitude and the longitude of each position information L have been transformed into an approximate place as shown in FIG. 2B. For example, a user carries the GPS device and passes through a MRT (Mass Rapid Transit), a museum, a recreation center and a hotel.

Figure 2D:
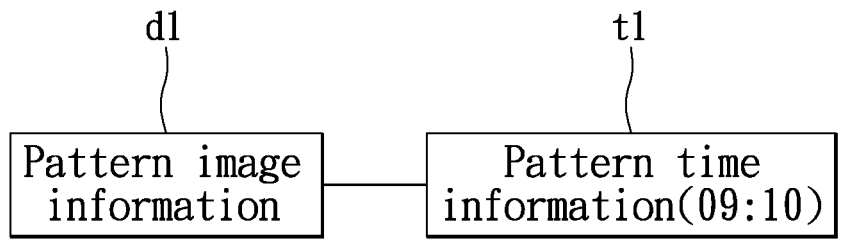
FIG. 2D is a schematic view of the pattern image datum and the pattern time information according to the present invention.

The step S104 is that: referring to FIGS. 2A, 2C and 2D, using a digital camera D to capture the pattern P in order to obtain a pattern image datum d1, and the pattern image datum d1 obtaining pattern time information t1 that is provided by the digital camera D. For example, when the user uses the digital camera D to capture the pattern P, the pattern time information t1 is shown as 09:10 o'clock that is provided by the digital camera D.

Figure 2E:
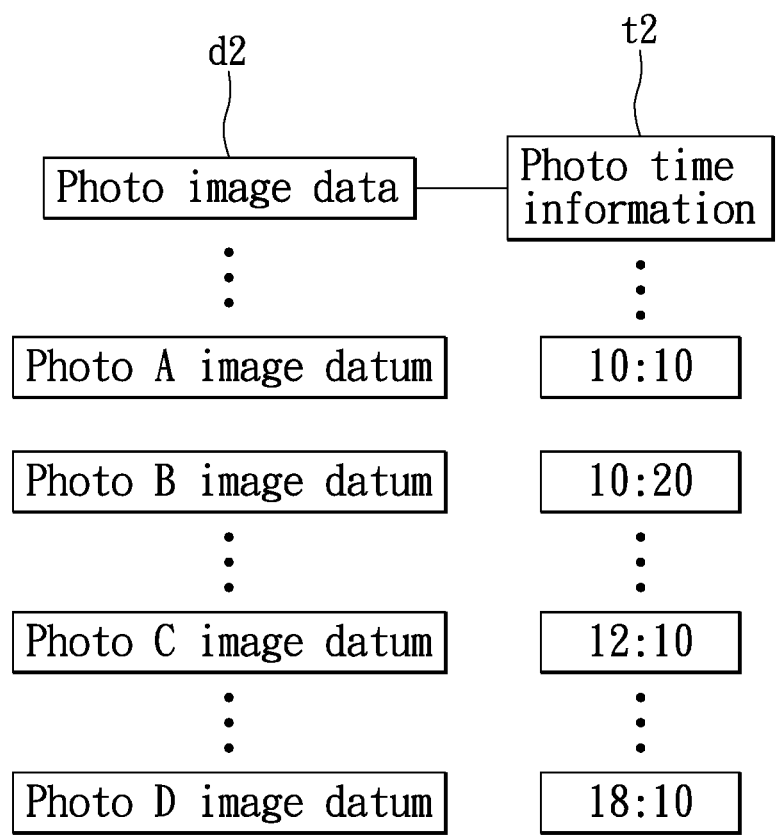
FIG. 2E is a schematic view of the photo image datum and the photo time information according to the present invention.

The step S106 is that: referring to FIGS. 2A and 2E, using the digital camera D to shoot in order to obtain a plurality of photo image data d2, and each photo image datum d2 obtaining corresponding photo time information t2 that is provided by the digital camera D. For example, Photo A image datum is captured at 10:10 o'clock, Photo B image datum is captured at 10:20 o'clock, Photo C image datum is captured at 12:10 o'clock, and Photo D image datum is captured at 18:10 o'clock.

Figure 2F:
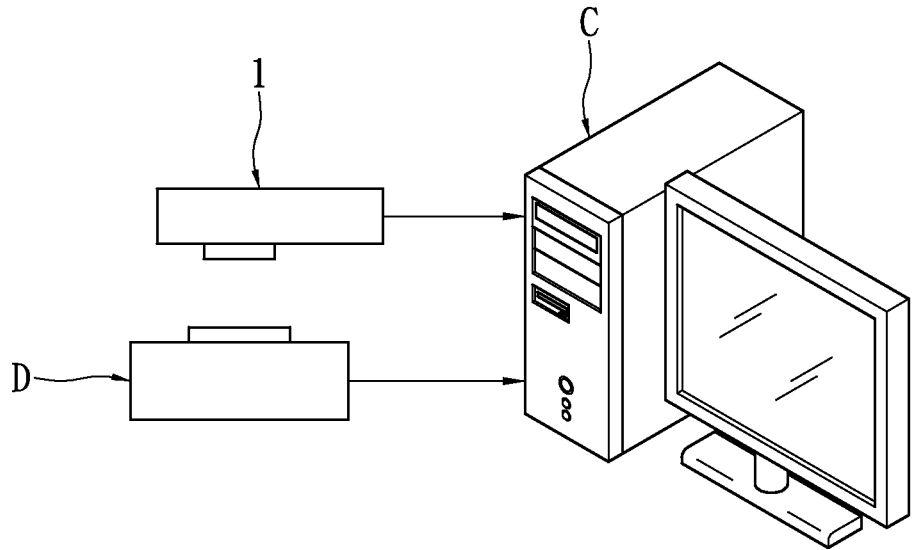
FIG. 2F is a schematic view of the GPS device and the digital camera both connected to the computer according to the present invention.

The step S108 is that: referring to FIGS. 2A and 2F, transmitting the time and position information sets S, the pattern image datum d1 and the photo image data d2 to a computer C.

Figure 2G:
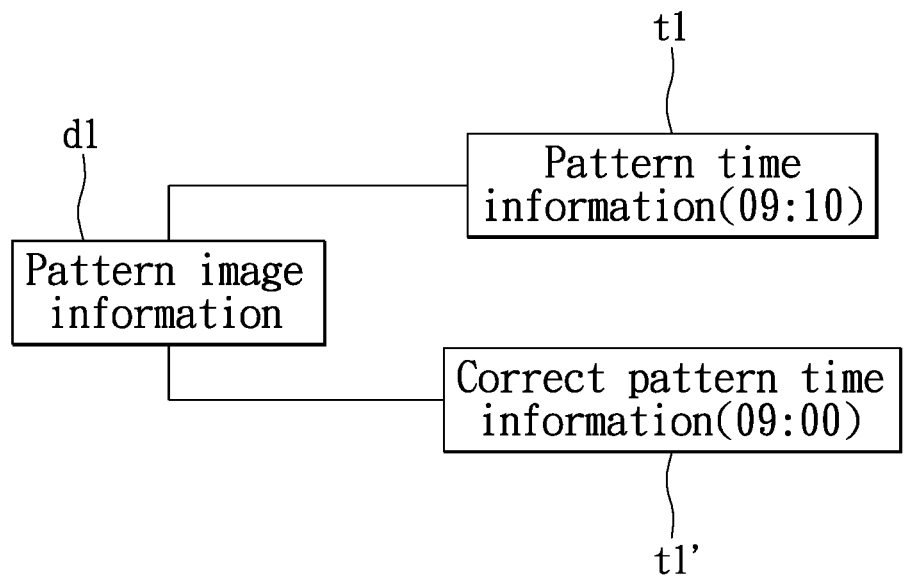
FIG. 2G is a schematic view of the pattern image datum, the pattern time information and the correct pattern time information according to the present invention.

The step S110 is that: referring to FIGS. 2A and 2G, decoding the pattern image datum d1 by an inner program of the computer C to obtain correct pattern time information t1'. For example, the pattern image datum d1 is decoded for obtaining the correct pattern time information t1' shown as 9:00 o'clock.

The step S112 is that: referring to FIGS. 2A and 2G, comparing the correct pattern time information t1' (9:00 o'clock) of the pattern image datum d1 with the pattern time information t1 (9:10 o'clock) of the photo image datum d1 to obtain a time error value. For example, the correct pattern time information t1' is 9:00 o'clock and the pattern time information t1 is 9:10 o'clock, so that the pattern time information t1 is ten minutes faster than the correct pattern time information t1'. Therefore, the time captured by the digital camera D is ten minutes faster than the correct time captured by the PGS recorder 1.

Figure 2H:
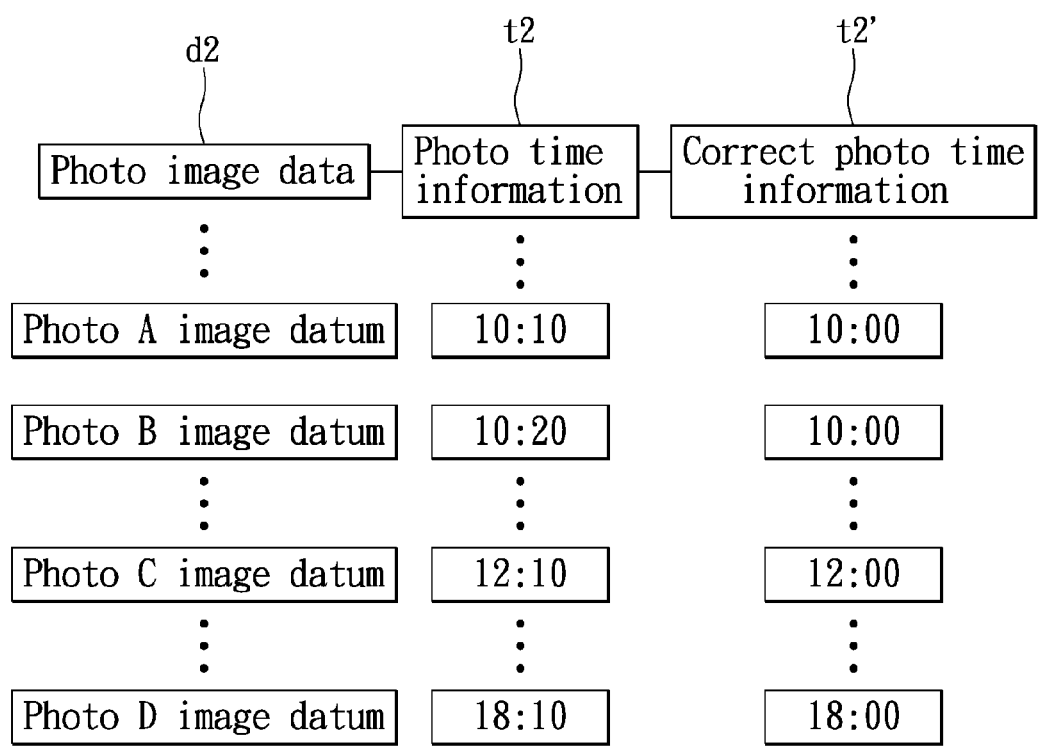
FIG. 2H is a schematic view of the photo image datum, the photo time information and the correct photo time information according to the present invention.

The step S114 is that: referring to FIGS. 2A and 2H, using the time error value to adjust the photo time information t2 of each photo image datum d2 in order to obtain correct photo time information t2' for each photo image datum d2. For example, the photo time information t2 of each photo image datum d2 subtracts ten minutes in order to obtain correct photo time information t2' for each photo image datum d2. In other words, the photo time information t2 of each photo image datum d2 is placed by the correct photo time information t2'.

Figure 2I:
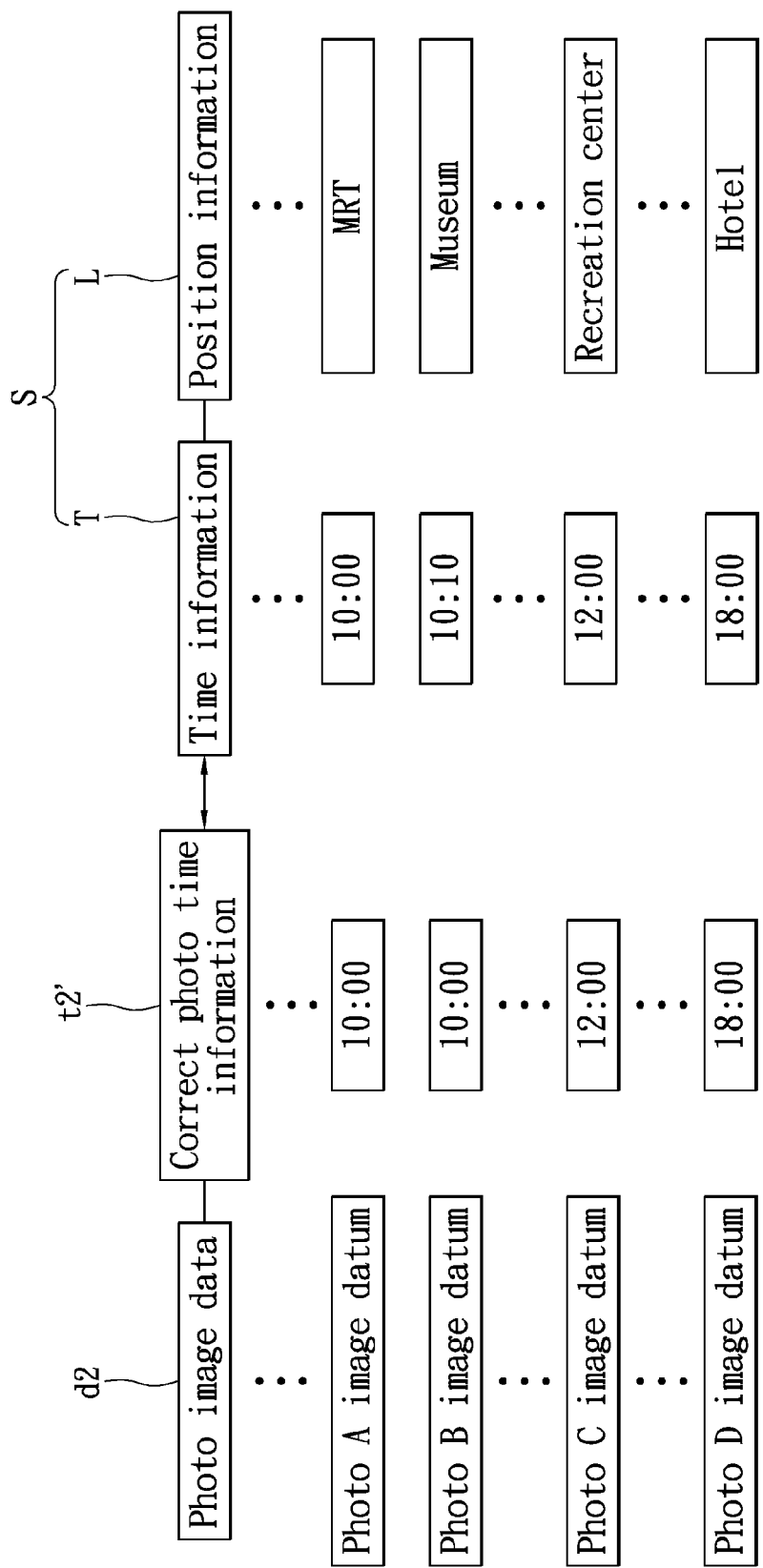
FIG. 2I is a schematic view of the photo image datum, the photo time information and the time and position information sets according to the present invention.
Figure 2J:
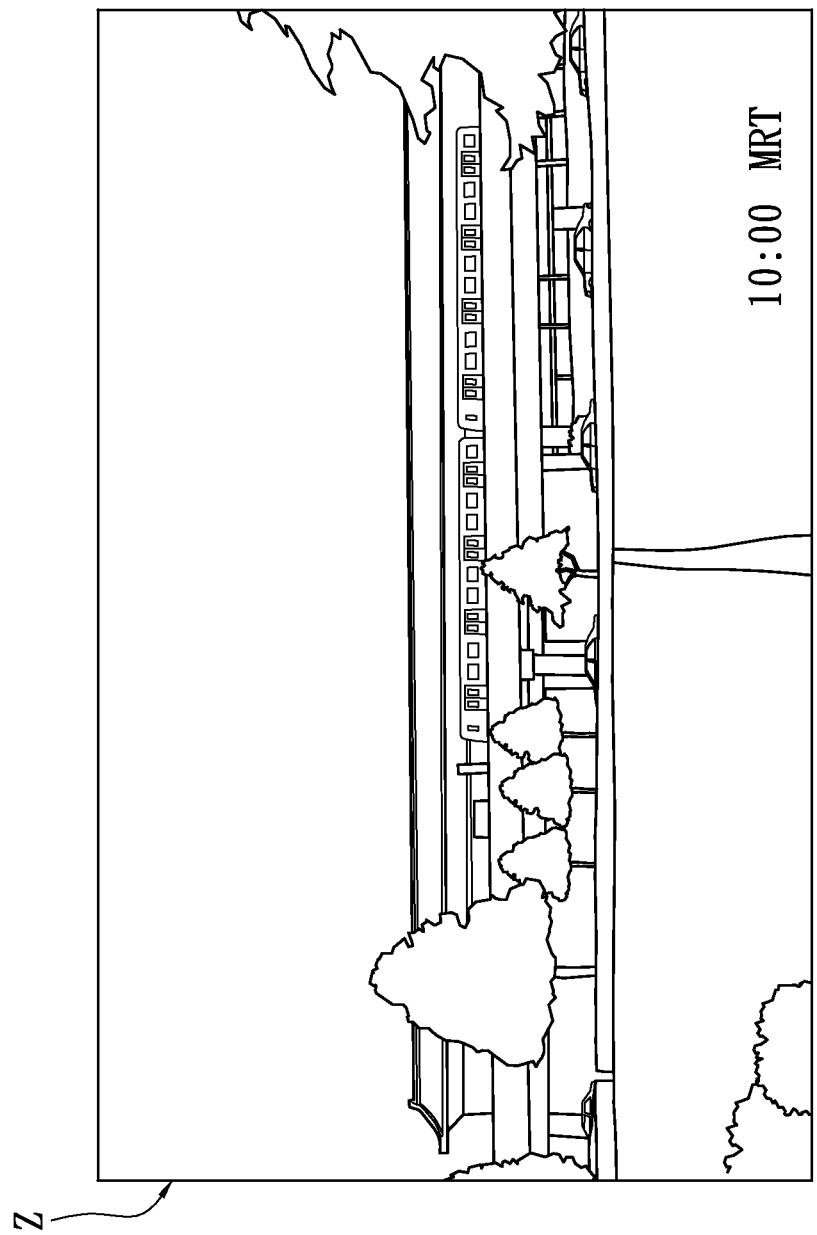
FIG. 2J is a schematic view of the photo with the correct photo time information and the correct position information according to the present invention.

The step S116 is that: referring to FIGS. 2A and 2I, comparing the correct photo time information T2' of each photo image datum d2 with the time and position information sets S in order to obtain correct position information L for each photo image datum d2. For example, referring to FIG. 2I:

(1) The Photo A image datum is captured at a MRT (Mass Rapid Transit) and at 10:00 o'clock by using a digital camera D. Both the time (10:00) and the position (MRT) are taken as meta data that are written into the Photo A image datum, and the time (10:00) and the position (MRT) can be selectably shown on a printed photo Z (as shown in FIG. 2J).

(2) The Photo B image datum is captured at a museum and at 10:10 o'clock by using a digital camera D. Both the time (10:10) and the position (museum) are taken as meta data that are written into the Photo B image datum, and the time (10:10) and the position (museum) can be selectably shown on a printed photo (not shown in figures).

(3) The Photo C image datum is captured at a recreation center and at 12:00 o'clock by using a digital camera D. Both the time (12:00) and the position (recreation center) are taken as meta data that are written into the Photo C image datum, and the time (12:00) and the position (recreation center) can be selectably shown on a printed photo (not shown in figures).

(4) The Photo D image datum is captured at a hotel and at 18:00 o'clock by using a digital camera D. Both the time (18:00) and the position (hotel) are taken as meta data that are written into the Photo D image datum, and the time (18:00) and the position (hotel) can be selectably shown on a printed photo (not shown in figures).

Figure 3:
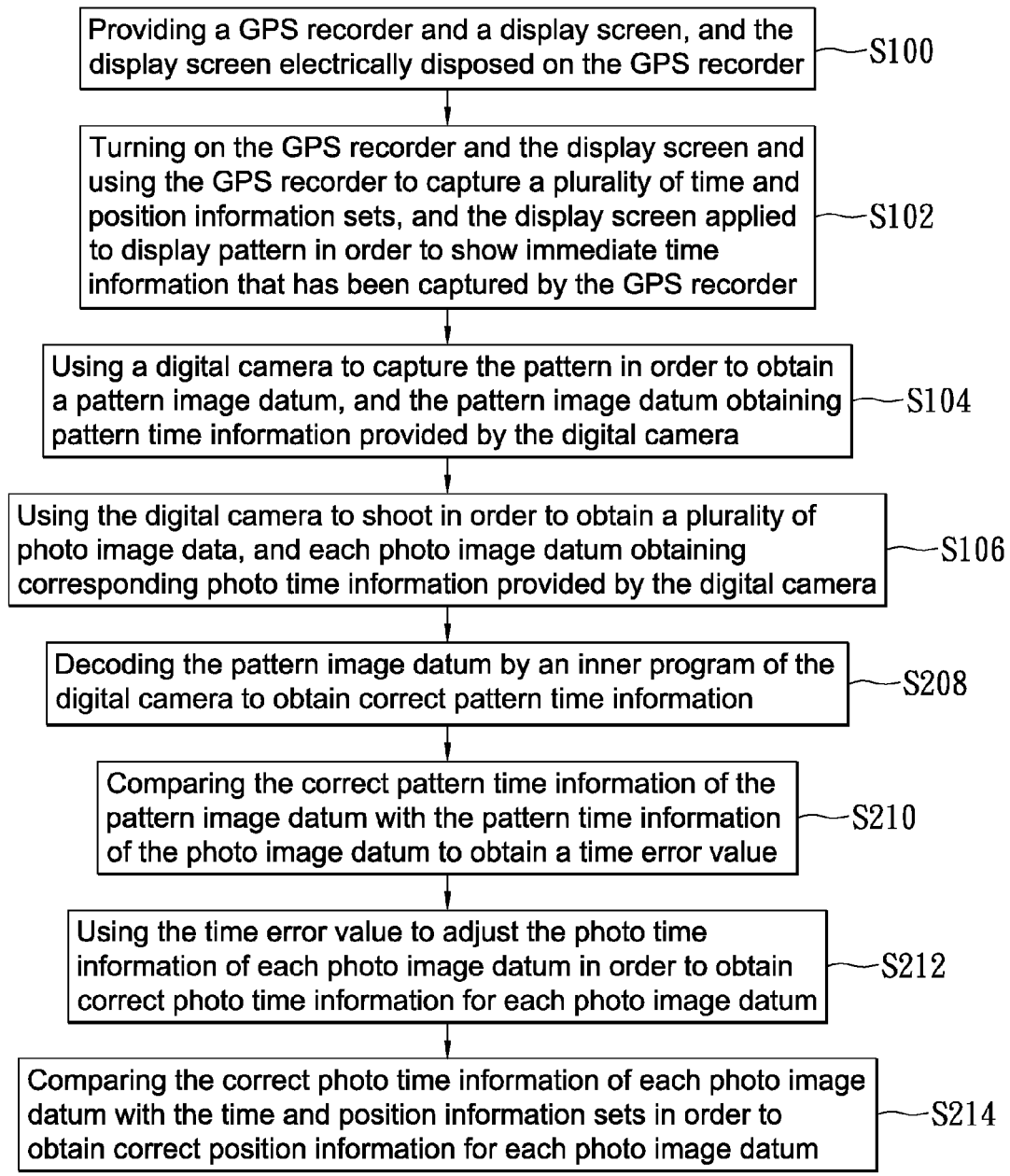
FIG. 3 is a flowchart of the method for using the GPS device with a display function according to the second embodiment of the present invention.

Referring to FIG. 3, the difference between the second embodiment and the first embodiment is that: the second embodiment can omit the step of S108. Therefore, after the step of S106, the second embodiment executes the step of S208 directly.

The step of S208 is that: referring to FIGS. 3 and 2G, decoding the pattern image datum d1 by an inner program of the digital camera D to obtain correct pattern time information t1'. For example, the pattern image datum d1 is decoded for obtaining the correct pattern time information t1' shown as 9:00 o'clock. In addition, the steps of S210, S212 and S214 are the same as the steps of S112, S114 and S116.

In conclusion, the GPS device can use a pattern to display the correct time and the correct time can be applied to adjust the shoot time of the photo captured by the digital camera. Hence, the present invention can provides a correct shoot time and a correct shoot place for each photo, and the correct shoot time and the correct shoot place can be selectably shown on the corresponding photo.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A method for using a GPS device with a display function, comprising:
    providing a GPS recorder and a display screen, wherein the display screen is electrically disposed on the GPS recorder;
    turning on the GPS recorder and the display screen and using the GPS recorder to capture a plurality of time and position information sets, wherein the display screen displays pattern in order to show time information that has been captured by the GPS recorder;
    using a digital camera to capture the pattern in order to obtain a pattern image datum, wherein the pattern image datum obtains pattern time information that is provided by the digital camera;
    using the digital camera to shoot in order to obtain a plurality of photo image data, wherein each photo image datum obtains photo time information that is provided by the digital camera;
    transmitting the time and position information sets, the pattern image datum and the photo image data to a computer;
    decoding the pattern image datum by an inner program of the computer to obtain correct pattern time information;
    comparing the correct pattern time information of the pattern image datum with the pattern time information of the photo image datum to obtain a time error value;
    using the time error value to adjust the photo time information of each photo image datum in order to obtain correct photo time information for each photo image datum; and
    comparing the correct photo time information of each photo image datum with the time and position information sets in order to obtain correct position information for each photo image datum.

2. The method according to claim 1, wherein the GPS recorder has a GPS casing that encloses one part of the display screen and only a display area of the display screen is exposed.

3. The method according to claim 1, wherein the display screen is a liquid crystal display.

4. The method according to claim 1, wherein the pattern shown by the display screen is a two-dimension barcode.

5. The method according to claim 1, wherein the display screen displays the pattern in order to show position information that has been captured by the GPS recorder, and the position information includes a latitude and a longitude.

6. The method according to claim 5, wherein the GPS recorder has a memory disposed therein for storing the time information and the position information.

7. A method for using a GPS device with a display function, comprising:
    providing a GPS recorder and a display screen, wherein the display screen is electrically disposed on the GPS recorder;
    turning on the GPS recorder and the display screen and using the GPS recorder to capture a plurality of time and position information sets, wherein the display screen displays pattern in order to show time information that has been captured by the GPS recorder;
    using a digital camera to capture the pattern in order to obtain a pattern image datum, wherein the pattern image datum obtains pattern time information that is provided by the digital camera;
    using the digital camera to shoot in order to obtain a plurality of photo image data, wherein each photo image datum obtains photo time information that is provided by the digital camera;
    decoding the pattern image datum by an inner program of the digital camera to obtain correct pattern time information;
    comparing the correct pattern time information of the pattern image datum with the pattern time information of the photo image datum to obtain a time error value;
    using the time error value to adjust the photo time information of each photo image datum in order to obtain correct photo time information for each photo image datum; and
    comparing the correct photo time information of each photo image datum with the time and position information sets in order to obtain correct position information for each photo image datum.

8. The method according to claim 7, wherein the GPS recorder has a GPS casing that encloses one part of the display screen and only a display area of the display screen is exposed.

9. The method according to claim 7, wherein the display screen is a liquid crystal display.

10. The method according to claim 7, wherein the pattern shown by the display screen is a two-dimension barcode.

11. The method according to claim 7, wherein the display screen displays the pattern in order to show position information that has been captured by the GPS recorder, and the position information includes a latitude and a longitude.

12. The method according to claim 11, wherein the GPS recorder has a memory disposed therein for storing the time information and the position information.

* * * * *